(12) United States Patent
Gahleitner et al.

(10) Patent No.: US 8,030,403 B2
(45) Date of Patent: Oct. 4, 2011

(54) TRANSPARENT POLYPROPYLENE COMPOSITION

(75) Inventors: Markus Gahleitner, Neuhofen/Krems (AT); Nina Ackermans, Tessenderlo (BE); Tung Pham, Linz (AT); Espen Ommundsen, Langesund (NO); Christelle Grein, Linz (AT); Doris Machl, Linz (AT)

(73) Assignee: Borealis Technology Oy, Porvoo (FI)

( * ) Notice: Subject to any disclaimer, the term of this patent is extended or adjusted under 35 U.S.C. 154(b) by 167 days.

(21) Appl. No.: 12/377,671

(22) PCT Filed: Jun. 12, 2007

(86) PCT No.: PCT/EP2007/005177
§ 371 (c)(1),
(2), (4) Date: May 14, 2009

(87) PCT Pub. No.: WO2008/019722
PCT Pub. Date: Feb. 21, 2008

(65) Prior Publication Data
US 2010/0093939 A1    Apr. 15, 2010

(30) Foreign Application Priority Data
Aug. 17, 2006  (EP) .................................. 06017190

(51) Int. Cl.
*C08L 23/04* (2006.01)
*C08L 23/10* (2006.01)
(52) U.S. Cl. ........................................ 525/191; 525/240
(58) Field of Classification Search .................. 525/191, 525/240
See application file for complete search history.

(56) References Cited

FOREIGN PATENT DOCUMENTS

| EP | 1108531 | 6/2001 |
|---|---|---|
| EP | 1428854 | 6/2004 |

OTHER PUBLICATIONS

International Search Report dated Sep. 12, 2007 for PCT/EP2007/005177.
International Preliminary Report on Patentability dated Aug. 24, 2008 for PCT/EP2007/005177.
Gahleitner, M., et at, "Propylene-Ethylene Random Copolymers: Comonomer Effects on Crystallinity and Application Properties:" Journal of Applied Polymer Science, vol. 95, 1073-1081 (2005).

*Primary Examiner* — Nathan M Nutter
(74) *Attorney, Agent, or Firm* — Milbank, Tweed, Hadley & McCloy LLP

(57) ABSTRACT

The present invention relates to a composition, in particular to a polypropylene composition, and articles thereof, having an optimal balance between mechanical properties and transparency and thus the composition is particular suitable for packaging applications.

13 Claims, 2 Drawing Sheets

TRANSPARENT POLYPROPYLENE COMPOSITION

Figure 1:
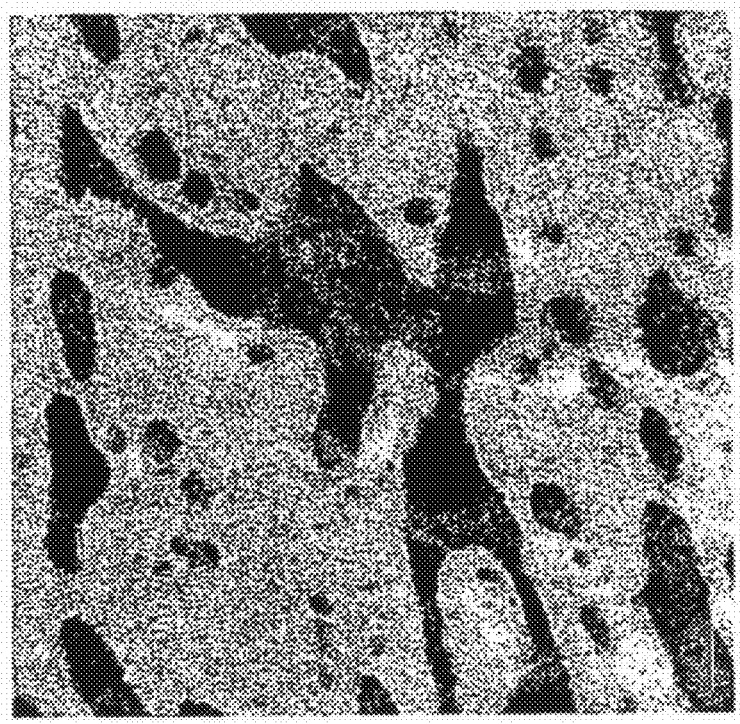
Figure 1:
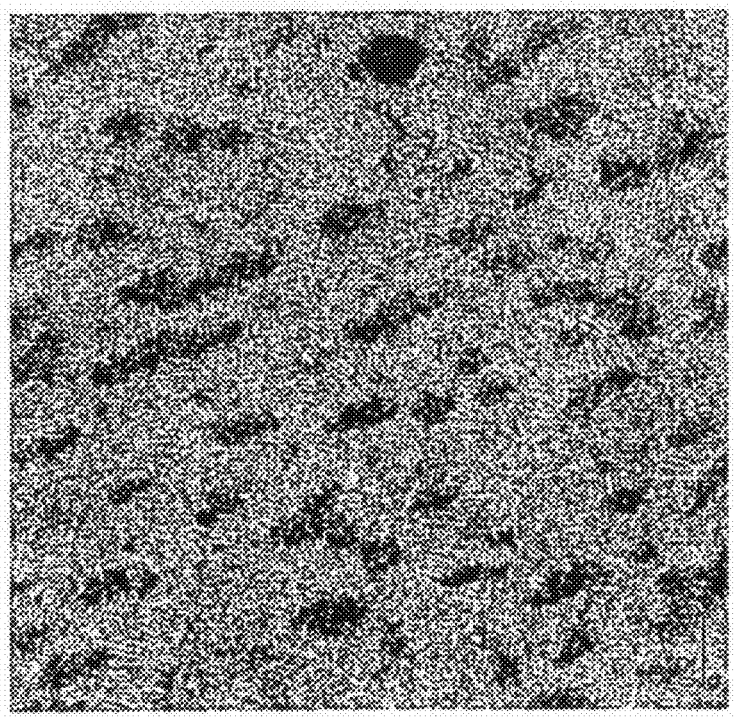

This application is based on International Application PCT/EP2007/005177 filed Jun. 12, 2007, which claims priority to European Patent Application No. 06 017 190.7 filed on Aug. 17, 2006, the disclosures of which are incorporated by reference herein in their entireties.

The present invention relates to a polypropylene composition, and having good mechanical properties and a high transparency, to articles comprising the polypropylene composition, and to the use of the polypropylene composition for the production of articles.

High transparency is one of the most frequently required properties of polymer applications, especially in the packaging area. The optical appeal of a packaging system to the customer depends strongly on this factor, and it is at the same time decisive for visual recognition of the packaged product. Together, these factors make transparency a primary marketing instrument.

Additionally, good mechanical properties like impact strength as well as flexibility are required for packaging applications. However, in general an improvement of mechanical properties leads to a degradation of transparency and vice versa.

This problem has consequently been tackled from various directions in the past. Nevertheless, all approaches have so far given unsatisfactory results, especially when the base polymer and reference is a highly transparent material like a nucleated random copolymer or terpolymer for film or thin-wall injection moulding applications.

There are mainly three types of polypropylenes, which are used in such applications: polypropylene homopolymers, polypropylene random copolymers and heterophasic propylene copolymers.

Propylene homopolymers are characterized by their high stiffness, especially the alpha-nucleated versions. The disadvantage of polypropylene homopolymers is their low impact strength, which leads to restrictions regarding the temperature range of application.

Polypropylene random copolymers like propylene-ethylene random copolymers are characterized by good optical properties, especially high transparency, but the toughness of these polymers at temperatures at or below 0° C. is often not sufficient despite the glass transition temperature being lower than for polypropylene homopolymers. Additionally, the practically applicable temperature range for sealing and welding is not sufficiently wide.

Modifications which are capable of correcting both problems while maintaining transparency have limited success so far.

Applications, which use linear low density polyethylenes (LLDPE) as modifier, can be ruled out as it will lower the onset temperature of sealability, but not provide significant toughness improvement due to bad phase adhesion and reduce transparency. Conventional ethylene-based plastomers with hexene or octene (single-site based very low density polyethylene/ultra low density polyethylene (VLDPE/ULDPE) grades of homogeneous composition) are capable of improving sealability and give a significant impact strength improvement but will again compromise transparency.

EP 1 352 016 relates to a polypropylene terpolymer modified with a special ULDPE grade, however, also this polypropylene modified by ULDPE shows bad transparency while maintaining good impact strength and weldability.

Heterophasic propylene copolymers have a better impact strength over a wide temperature range, but usually heterophasic copolymers have low transparency. Heterophasic propylene copolymers are well established in a lot of applications because of their good stiffness/impact balance together with good flowability.

Heterophasic polymers are polymers having a matrix phase and a dispersed phase. The matrix phase is usually a propylene homopolymer or propylene-ethylene and/or alpha-olefin copolymer and the disperse phase is usually an ethylene/alpha-olefin rubber copolymer.

Impact strength is mainly influenced by the amount of rubber, its molecular weight and its composition. Most applications require a medium to high molecular weight of the rubber in order to achieve sufficient impact strength, especially at lower temperatures. It is, however, well-known that propylene copolymers with the medium to higher molecular weight rubber usually exhibit a non-transparent appearance, whereas materials with a low molecular weight rubber have high transparency, but low impact strength.

In general, it is not possible with the present heterophasic propylene copolymer compositions to simultaneously achieve both properties, namely high impact strength and high transparency. Achieving low stiffness would also be beneficial.

Therefore, the object of the present invention was to provide a polypropylene composition, which shows an improved transparency while maintaining good mechanical properties and thus to obtain an optimal balance between mechanical properties and transparency in the polypropylene composition.

The present invention is based on the finding that the above object can be achieved by compositions comprising specific propylene copolymers and specific ethylene-propylene rubber with random insertion of the ethylene part and crystallinity in the polypropylene segments.

Therefore, the present invention provides a polypropylene composition comprising a) a propylene copolymer (A) having a melting point below 160° C. and a flexural modulus below 1000 MPa, and b) an ethylene-propylene rubber (B) having a propylene content of 80 to 92 wt.-% based on the weight of ethylene-propylene rubber (B), wherein the polypropylene composition has at least two glass transition points ($T_g$) at a temperature of equal to or below 0° C., and one of the two glass transition points ($T_g$) is between −45 and −5° C. and wherein the polypropylene composition has a PE crystallinity of less than 3%.

The polypropylene composition of the present invention simultaneously shows good mechanical properties and a high transparency and thus the composition is particularly suitable for packaging applications.

The polypropylene composition of the present invention comprises a propylene copolymer (A) and an ethylene-propylene rubber (B) dispersed in the matrix of propylene copolymer (A), said ethylene-propylene rubber (B) being coupled to the matrix by co-crystallisation at the interface as can be seen from FIG. 1.

The propylene copolymer (A) can either be a random copolymer or a heterophasic copolymer.

In case the propylene copolymer (A) is a heterophasic copolymer it preferably comprises, or consists of a random copolymer matrix phase and an ethylene-propylene rubber (C) dispersed therein.

The ethylene-propylene rubber (C) preferably contains from 30-70 wt % of propylene, based on the weight of the ethylene-propylene rubber (C). Preferably, the amount of ethylene-propylene rubber (C) is between 8 to 40 wt % based on the amount of propylene copolymer (A).

The propylene copolymer (A) of the present invention has a melting point below 160° C., more preferred below 150° C. It is preferred that the melting point of propylene copolymer (A) is at least 120° C.

In addition, the used propylene copolymer (A) has a flexural modulus below 1000 MPa, more preferred below 800 MPa, most preferred below 600 MPa, measured according to ISO 178. The flexural modulus of propylene copolymer (A) is preferably at least 300 MPa.

Furthermore, in the present invention the polypropylene copolymer (A) preferably has a crystallinity as determined by differential scanning calorimetry (DSC) of 20 to 55%, more preferably of 30 to 50%. The crystallinity of a polymer indicates the degree of inter- and intra-molecular order of the polymer components. It can be calculated from the melting enthalpy $\Delta H_m$ in a standard DSC experiment according to ISO 3146 run at a heating rate of 10° C./min, assuming a melting enthalpy of 209 J/g for a completely crystalline propylene homopolymer (see e.g. the following reference: Markus Gahleitner, Pirjo Jääskeläinen, Ewa Ratajski, Christian Paulik, Jens Reussner, Johannes Wolfschwenger & Wolfgang Neiβl Propylene-Ethylene Random Copolymers: Comonomer Effects on Crystallinity and Application Properties, J. Appl. Polym. Sci. 95 (2005) 1073-81).

Additionally, the polypropylene copolymer (A) preferably has a melt flow rate (ISO 1133, 230° C./2.16 kg) of 0.1 to 100 g/10 min, more preferably of 1 to 30 g/10 min.

Moreover, it is preferred that the comonomer of propylene copolymer (A) is ethylene and/or a $C_4$-$C_{10}$ alpha-olefin like 1-butene, 1-pentene, 1-hexene, 1-heptene, 1-octene etc. or a mixture thereof. Especially preferred, in the present invention the comonomers are ethylene and 1-butene.

The comonomer content in the propylene copolymer (A) preferably is 2-30 wt %, more preferably 3-20 wt %, based on the total propylene copolymer (A).

Furthermore, in the present invention a specific ethylene-propylene rubber (B) is used as modifier, in order to obtain a good balance between mechanical properties and transparency in the composition.

In conventional ethylene-propylene rubbers the amount of propylene monomers ranges from 30 to 70 wt %, based on the total ethylene-propylene rubber. However, the ethylene-propylene rubber (B) of the present invention contains 80 to 92 wt % of propylene monomers, more preferably 83 to 91 wt %, most preferably 85 to 90 wt %, based on the total ethylene-propylene rubber (B).

It is preferred that the ethylene-propylene rubber (B) is used in an amount between 5 to 60 wt %, more preferred between 10 to 55 wt %, even more preferred between 15 to 50 wt % in the propylene polymer composition.

Furthermore, the ethylene-propylene rubber (B) modifier preferably has a weight average molecular weight of 40,000 to 300,000 g/mol, more preferably of 80,000 to 200,000 g/mol.

The molecular weight distribution (MWD) of ethylene-propylene rubber (B) preferably is from 1.8 to 4.5, more preferably from 2 to 3.

Moreover, the ethylene-propylene rubber (B) preferably exhibits a PP-crystallinity from 2 to 25% (based on and in relation to a melting enthalpy of 209 J/g for a 100% crystalline propylene homopolymer), more preferably of 5 to 10% of the crystallinity of the propylene copolymer (A).

Figure 2:
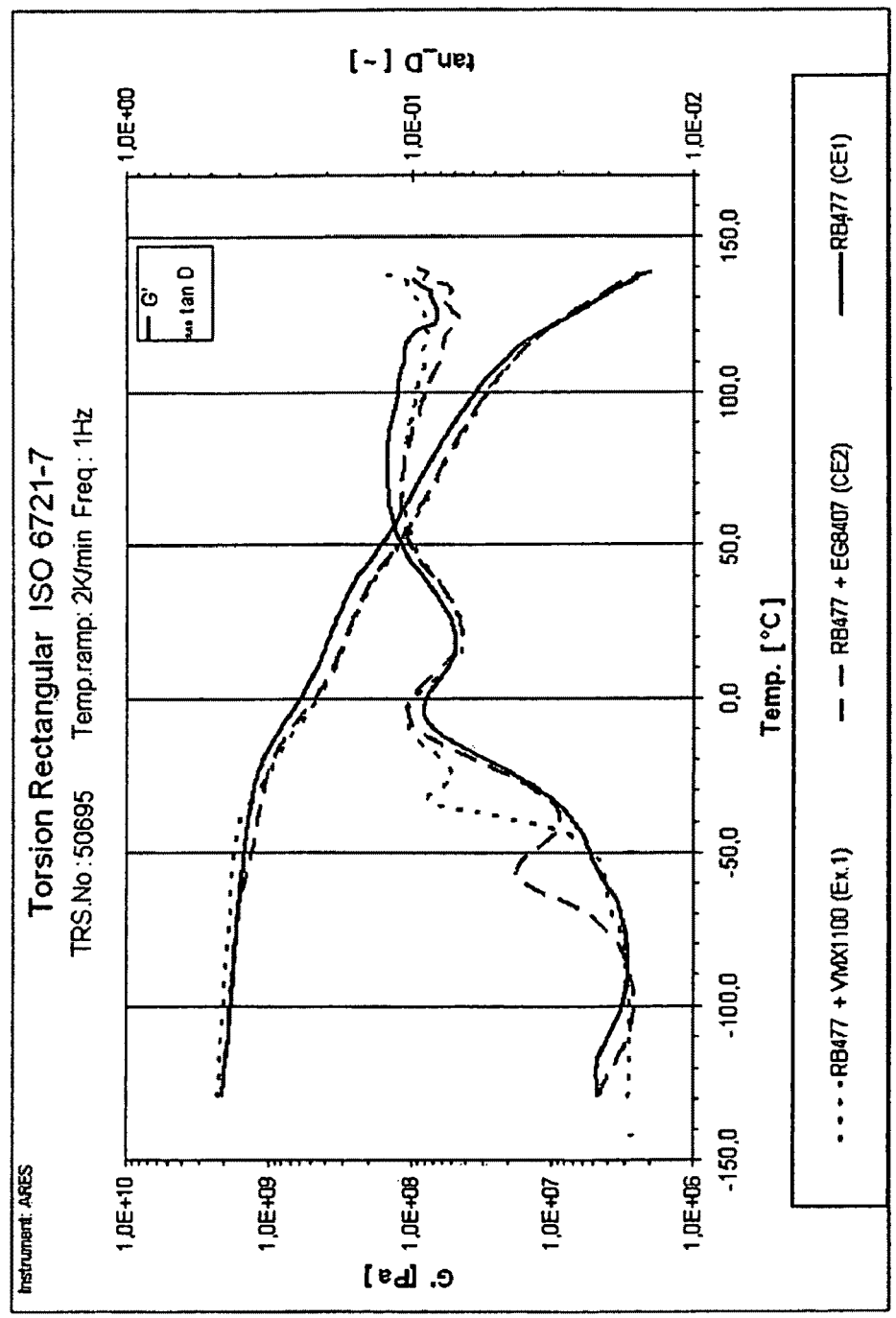

The polypropylene composition of the present invention comprises two glass transition points ($T_g$) at a temperature equal to or below 0° C. One of these glass transition points ($T_g$) is between −45 to −5° C. An example for a composition showing those glass transition points is shown in FIG. 2.

Moreover, it is preferred that the distance between the first and the second glass transition points ($T_g$) of the polypropylene composition is between 10 and 40° C., i.e. the first $T_g$ occurs at a temperature which is from 10 to 40° C. below the temperature of the second $T_g$.

Furthermore, the propylene composition of the present invention preferably shows a transparency above 73%, more preferred above 75% and even more preferred above 77% according to the measurement of ASTM D 1003-92.

The haze of the polypropylene composition of the present invention is preferably below 1.5%, more preferably below 1.2% according to the measurement of ASTM D 1003-92.

The impact strength of the polypropylene composition according to the Charpy notched impact strength test ISO 179 1 eA is preferably at +23° C. at least 60 kJ/m$^2$, more preferably at least 70 kJ/m$^2$ and most preferably at least 75 kJ/m$^2$, and at a temperature of −20° C. at least 1.5 kJ/m$^2$, more preferably of at least 2 kJ/m$^2$.

Production of Random Copolymer (A)

The propylene random copolymer (A) may be produced by single- or multistage process polymerisation of propylene and ethylene and/or α-olefins such as bulk polymerisation, gas phase polymerisation, slurry polymerisation, solution polymerisation or combinations thereof using conventional catalysts. A random copolymer can be made either in loop reactors or in a combination of loop and gas phase reactor. Those processes are well known to one skilled in the art.

A suitable catalyst for the polymerisation of the propylene random copolymer is any stereospecific catalyst for propylene polymerisation which is capable of polymerising and copolymerising propylene and comonomers at a temperature of 40 to 110° C. and at a pressure from 10 to 100 bar. Ziegler Natta catalysts as well as metallocene catalysts are suitable catalysts.

One skilled in the art is aware of the various possibilities to produce propylene copolymers and will simply find out a suitable procedure to produce suitable polymers which are used in the present invention, see e.g. Moore, E. P., Polypropylene Handbook, Hanser, N.Y., 1996, pages 89-91.

Production of Heterophasic Copolymer (A)

A heterophasic copolymer (A) may also be produced by multistage process polymerisation of propylene and ethylene and/or an α-olefin such as bulk polymerisation, gas phase polymerisation, slurry polymerisation, solution polymerisation or combinations thereof using conventional catalysts.

A preferred process is a combination of a bulk slurry loop reactor(s) and gas phase reactor(s). The matrix polymer can be made either in loop reactor(s) or in a combination of loop and gas phase reactor.

The polymer produced in this way is transferred into another reactor and the disperse phase, the ethylene-propylene rubber (C), is polymerised. Preferably this polymerisation step is done in a gas phase polymerization in one or more gas phase reactors.

A suitable catalyst for the polymerisation of the educt heterophasic propylene copolymer is any stereospecific catalyst for propylene polymerisation which is capable of polymerising and copolymerising propylene and comonomers at a temperature of 40 to 110° C. and at a pressure form 10 to 100 bar. Ziegler Natta catalysts as well as metallocene catalysts are suitable catalysts.

One skilled in the art is aware of the various possibilities to produce such heterophasic copolymers and will simply find out a suitable procedure to produce suitable heterophasic copolymers which can be used in the present invention.

Production of Ethylene-Propylene Rubber (B)

Ethylene-propylene rubbers (B) may be produced by known polymerisation processes such as solution, suspension and gas-phase polymerisation using conventional catalysts. Ziegler Natta catalysts as well as metallocene catalysts are suitable catalysts.

A widely used process is the solution polymerisation. Ethylene, propylene and catalyst systems are polymerised in an excess of hydrocarbon solvent. Stabilisers and oils, if used, are added directly after polymerisation. The solvent and unreacted monomers are then flashed off with hot water or steam, or with mechanical devolatilisation. The polymer, which is in crumb form, is dried with dewatering in screens, mechanical presses or drying ovens. The crumb is formed into wrapped bales or extruded into pellets.

The suspension polymerisation process is a modification of bulk polymerisation. The monomers and catalyst system are injected into the reactor filled with propylene. The polymerisation takes place immediately, forming crumbs of polymer that are not soluble in the propylene. Flashing off the propylene and comonomer completes the polymerisation process.

The gas-phase polymerisation technology consists of one or more vertical fluidised beds. Monomers and nitrogen in gas form along with catalyst are fed to the reactor and solid product is removed periodically. Heat of reaction is removed through the use of the circulating gas that also serves to fluidise the polymer bed. Solvents are not used, thereby eliminating the need for solvent stripping, washing and drying.

The production of ethylene-propylene rubbers is also described in detail in e.g. U.S. Pat. No. 3,300,459, U.S. Pat. No. 5,919,877, EP 0 060 090 A1 and in a company publication by EniChem "DUTRAL, Ethylene-Propylene Elastomers", pages 1-4 (1991).

Preferably, ethylene-propylene rubbers, which are commercially available and which fulfill the indicated requirements, can be used.

Optionally, additives conventionally used in such polypropylene compositions, for example antioxidants, neutralizer, inorganic fillers, anti-blocking agents, nucleation agents, lubricants or antistatic agents, may be added to the composition before, during or after the blending step of the polymer components in a manner known in the art. Usually, the amount of such conventional additives is 10 wt % or less, preferably 5 wt % or less, of the total polymer composition.

The polypropylene composition can be used in various applications, like film or injection moulding application, which are produced by any method known in the art.

Furthermore, the produced film of the present invention may be a cast or blown film consisting of one or more layers, wherein at least one layer comprises the polypropylene composition of the present invention, and can be non-oriented or mono- or biaxially oriented.

1. MEASUREMENT METHODS a) Melt Flow Rate

The melt flow rate is determined according to ISO 1133 and it is indicated in g/10 min. The MFR is an indication of the flowability and thus the processability of the polymer. The higher the melt flow rate, the lower the viscosity of the polymer. The MFR of propylene composition is measured with a load of 2.16 kg at 230° C.

b) Charpy Notched Impact Test

The impact strength is determined as Charpy Impact Strength according to ISO 179 1 eA at +23° C. and at −20° C. on injection moulded specimens of 80×10×4 mm.

c) Flexural Modulus

The flexural modulus was determined according to ISO 178 on injection moulded specimens of 80×10×4 mm.

d) Transparency

Transparency was measured according to ASTM D 1003/92 on injection moulded plaques of 60×60×2 mm.

e) Haze

Haze was determined according to ASTM D 1003/92 on three layer coextruded cast films (thickness 25 μm).

f) Glass Transition Point

The glass transition points were measured using dynamic-mechanical analysis according to ISO 6721-7.

g) Crystallinity

The crystallinity of the polymers were calculated from the melting enthalpy $\Delta H_m$ in a standard differential scanning calorimetry (DSC) experiment according to ISO 3146 running at a heating rate of 10° C./min and assuming a melting enthalpy of 209 J/g for a completely crystalline propylene homopolymer (see e.g. the following reference: Markus Gahleitner, Pirjo Jääskeläinen, Ewa Ratajski, Christian Paulik, Jens Reussner, Johannes Wolfschwenger & Wolfgang Neiβ1, Propylene-Ethylene Random Copolymers: Comonomer Effects on Crystallinity and Application Properties, J. Appl. Polym. Sci. 95 (2005) 1073-81). of 209 J/g).

2. EXAMPLES

The different polymer compositions are produced by compounding the propylene copolymers (A) with the specific ethylene-propylene rubber (B) in a twin-screw extruder at temperatures of 200-240° C. The propylene copolymers (A) are produced either in a combination of two sequential liquid-phase loop reactors possibly followed by a gas-phase reactor, or in a combination of one liquid-phase loop reactor followed by two sequential gas-phase reactors.

Compounds:

All components of the compounds are commercially available.

Copolymer (A):

Borclear RB477MO produced by Borealis is an alpha-nucleated ethylene-propylene random copolymer for blow moulding applications containing 4.8 wt % ethylene and having an MFR of 1.5 g/10 min. The material has a flexural modulus of 900 MPa, a melting point of 140° C. and a crystallinity of 35%.

Borsoft SD233CF produced by Borealis is a ethylene-propylene random-heterophasic copolymer for cast film applications containing 24 wt % ethylene and having an MFR of 7 g/10 min. The material has a flexural modulus of 400 MPa, a melting point of 138-142° C. and a crystallinity of 30%.

HB600TF produced by Borealis is a propylene homopolymer for thermoforming applications having an MFR of 2 g/10 min. The material has a flexural modulus of 1300 MPa, a melting point of 162-166° C. and a crystallinity of 55%.

BC914TF produced by Borealis is an alpha-nucleated ethylene-propylene heterophasic copolymer for thermoforming applications containing 6 wt % ethylene and having an MFR of 3 g/10 min. The material has a flexural modulus of 1400 MPa, a melting point of 164-170° C. and a crystallinity of 48%.

Borclear TD210BF produced by Borealis is a ethylene-propylene-butene terpolymer for blown film applications containing 1 wt % ethylene and 7.5 wt % 1-butene and having an MFR of 6 g/10 min. The material has a flexural modulus of 700 MPa, a melting point of 128-132° C. and a crystallinity of 40%.

Ethylene-Propylene Rubber (B):

VMX 1100, 1120, 3000 and 2125 are ethylene-propylene rubber copolymers produced by Exxon having a propylene content between 80 to 92 wt %, based on the total ethylene propylene rubber, a MW distribution from 1.8 to 4.5. Compared with conventional ethylene-propylene rubbers, only a very small proportion of VMX 1100, 1120, 3000 and 2125 is crystalline polyethylene. Consequently, VMX 1100, 1120, 3000 and 2125 are characterized by a PE crystallinity of 2 to 6%. This is based on the relation between the melting enthalpy of fully crystalline polyethylene, for which a value of 245.3 J/g was assumed (c.f. Brandrup, J., Immergut, E. H., Eds. Polymer Handbook, $3^{rd}$ ed., Section V, p. 19) and the respective PE melting enthalpy peak(s) of VMX 1100, 1120, 3000 and 2125, obtained in a standard DSC experiment according to ISO 3146 (heating rate 10° C./min). In the same way the PE crystallinity and PP crystallinity of the compositions of the invention was determined. When determining the PP crystallinity, the respective PP melting enthalpy peak(s) must be used for calculation and put into relation to the melting enthalpy of 209 J/g for a 100% crystalline propylene homopolymer.

Engage EG 8407 is a ethylene-octene plastomer produced by DOW having a density of 870 kg/m³, a melt flow rate (190° C./2.16 kg) of 1.2 g/10 min and a melting point of 67° C.

FG 5190 is a linear low density polyethylene produced by Borealis with 1-butene as comonomer for blown film applications having a density of 919 kg/m³ and a melt flow rate (190° C./2.16 kg) of 1.2 g/10 min.

FIG. 1: TEM view of two compounds based on RB477MO; left—compound with Vistamaxx VMX 1100 (example 1), right—compound with Engage EG8407 (comparative example 2), transmission electron micrographs after contrasting with $RuO_4$; scale bar length 0.2 μm.

FIG. 2: DMTA diagram of the compositions of example 1, comparative example 1 and comparative example 2.

The mechanical properties and transparency were measured on injection moulded parts (Table 1) and an ABA three-layer structured cast film (Table 2), which had a overall thickness of 25 micrometer. The A-layer of the film consisted of compounds listed in Table 2 and had a thickness of 2.5 micrometer; the B-layer consisted of the propylene homopolymer HC101BF, which is a commercially available PP homopolymer, produced by Borealis, for blown film applications having an MFR of 2 g/10 min.

TABLE 1

Composition properties

| Example/ Comparative Example | Matrix Phase | Modifier Type | amount [wt %] | Glass transitions (DMTA) Tg(1) [° C.²] | Tg(2) [° C.] | Crystallinity (DSC) ΔHm(PP) [J/g] | Xc(PP) [%] | ΔHm(PE) [J/g] | Xc(PE) [%] |
|---|---|---|---|---|---|---|---|---|---|
| Ex 1 | RB477MO | VMX 1100 | 25 | −32 | −6 | 62 | 30 | 0.2 | 0.1 |
| Ex 2 | SD233CF | VMX 1120 | 10 | −36 | −5 | 79 | 38 | 0.8 | 0.3 |
| Ex 3 | SD233CF | VMX 1120 | 20 | −40 | −5 | 71 | 34 | 1.6 | 0.7 |
| Ex 4 | SD233CF | VMX 1120 | 30 | −42 | −5 | 64 | 31 | 2.5 | 1.0 |
| Ex 5 | SD233CF | VMX 1120 | 40 | −44 | −5 | 57 | 27 | 3.1 | 1.3 |
| Ex 6 | SD233CF | VMX 1120 | 60 | −45 | −5 | 50 | 24 | 4.6 | 1.9 |
| CE 1 | RB477MO | None | 0 | — | −6 | 98 | 47 | 0 | 0.0 |
| CE 2 | RB477MO | EG 8407 | 25 | −56 | −6 | 73 | 35 | 7.9 | 3.2 |
| CE 3 | RB477MO | FG5190 | 25 | −120 | −6 | 74 | 35 | 30 | 12.2 |
| CE 4 | SD233CF | None | 0 | — | −5 | 88 | 42 | 0 | 0.0 |
| CE 5 | HB600TF | None | 0 | — | +4 | 108 | 52 | 0 | 0.0 |
| CE 6 | HB600TF | VMX 1100 | 25 | −32 | +4 | 78 | 37 | 0.2 | 0.1 |
| CE 7 | BC914TF | None | 0 | −50 | +4 | 96 | 46 | 0 | 0.0 |
| CE 8 | BC914TF | VMX 1100 | 25 | −48 | +4 | 72 | 34 | 0.2 | 0.1 |

Moulded parts

| Example/ Comparative Example | Matrix Phase | Modifier type | amount [wt %] | Flexural modulus [MPa] | Impact strength +23° C. [kJ/m²] | −20° C. [kJ/m²] | Transparency [%] |
|---|---|---|---|---|---|---|---|
| Ex 1 | RB477MO | VMX 1100 | 25 | 364 | 81.8 | 2.2 | 78.5 |
| Ex 2 | SD233CF | VMX 1120 | 10 | 370 | 91.2 | 6.4 | 74.5 |
| Ex 3 | SD233CF | VMX 1120 | 20 | 269 | 109 | 10.2 | 75.8 |
| Ex 4 | SD233CF | VMX 1120 | 30 | 191 | n.b. | 65.9 | 78.1 |
| Ex 5 | SD233CF | VMX 1120 | 40 | 134 | n.b. | 90.6 | 80.5 |
| Ex 6 | SD233CF | VMX 1120 | 60 | 60 | n.b. | 111 | 84.6 |
| CE 1 | RB477MO | none | 0 | 800 | 30 | 2 | 78.2 |
| CE 2 | RB477MO | EG 8407 | 25 | 400 | 93.8 | 7.2 | 71.3 |
| CE 3 | RB477MO | FG5190 | 25 | 649 | 44.8 | 2.1 | 73.1 |
| CE 4 | SD233CF | none | 0 | 400 | 58.6 | 4.7 | 72.7 |
| CE 5 | HB600TF | none | 0 | 1300 | 7.2 | <1 | 72.6 |

TABLE 1-continued

| | | | | | | | |
|---|---|---|---|---|---|---|---|
| CE 6 | HB600TF | VMX 1100 | 25 | 646 | 38 | 1.2 | 64.6 |
| CE 7 | BC914TF | none | 0 | 1400 | 30 | 2 | 74.2 |
| CE 8 | BC914TF | VMX 1100 | 25 | 726 | 75.6 | 6.3 | 56.5 |

TABLE 2

| Example/ Comparative Example | Cast film | | | Haze |
|---|---|---|---|---|
| | Matrix phase | Modifier Type | amount [wt %] | 25 µm % |
| Ex 7 | TD210BF | VMX 2125 | 75 | 1.1 |
| Ex 8 | TD210BF | VMX 2125 | 15 | 1.1 |
| Ex 9 | TD210BF | VMX 3000 | 7.5 | 1.2 |
| CE 9 | TD210BF | None | 0 | 1.9 |
| CE 10 | TD210BF | EG8407 | 15 | 2.1 |

The invention claimed is:

1. A polypropylene composition comprising
   a) a propylene copolymer (A) having a melting point below 160° C. and a flexural modulus below 1000 MPa, and
   b) an ethylene-propylene rubber (B) having a propylene content of 80 to 92 wt.-% based on the weight of ethylene-propylene rubber (B),
wherein the polypropylene composition has at least two glass transition points ($T_g$) at a temperature of equal to or below 0° C. and one of the two glass transition points ($T_g$) is between −45 and −5° C., and wherein the polypropylene composition has a PE crystallinity of less than 3%.

2. Polypropylene composition according to claim 1, wherein the propylene copolymer (A) has a PP-crystallinity of 20-55%.

3. Polypropylene composition according to claim 1, wherein the distance between first and the second glass transition point ($T_g$) is between 10° C. and 40° C.

4. Polypropylene composition according to claim 1, wherein the propylene copolymer (A) has as comonomer ethylene and/or an C4 to C10-alpha-olefin.

5. Polypropylene composition according to claim 1, wherein the amount of the ethylene-propylene rubber (B) is between 5 to 60 wt %, based on the total polymer composition.

6. Polypropylene composition according to claim 1, wherein the PP-crystallinity of the ethylene propylene rubber (B) is from 2 to 25% of the crystallinity of propylene copolymer (A).

7. Polypropylene composition claim 1, wherein the composition has a transparency of at least 73% according to ASTM D 1003-92.

8. Polypropylene composition according to claim 1, wherein the composition has a haze of 1.5% or lower.

9. Polypropylene composition according claim 1, wherein the composition has an impact strength at +23° C. of at least 60 kJ/m2 and at −20° C. of at least 1.5 kJ/m2, in a Charpy notched test according to ISO 179 1 eA.

10. A method of producing an article, comprising using a polypropylene composition according to claim 1.

11. The method of claim 10, wherein the article is a film or an injection moulded article.

12. An article comprising a polypropylene composition according to claim 1.

13. An article according to claim 12, wherein the article is a multi-layer film which comprises at least one layer made of the polypropylene composition.

* * * * *